United States Patent Office 3,497,013
Patented Feb. 24, 1970

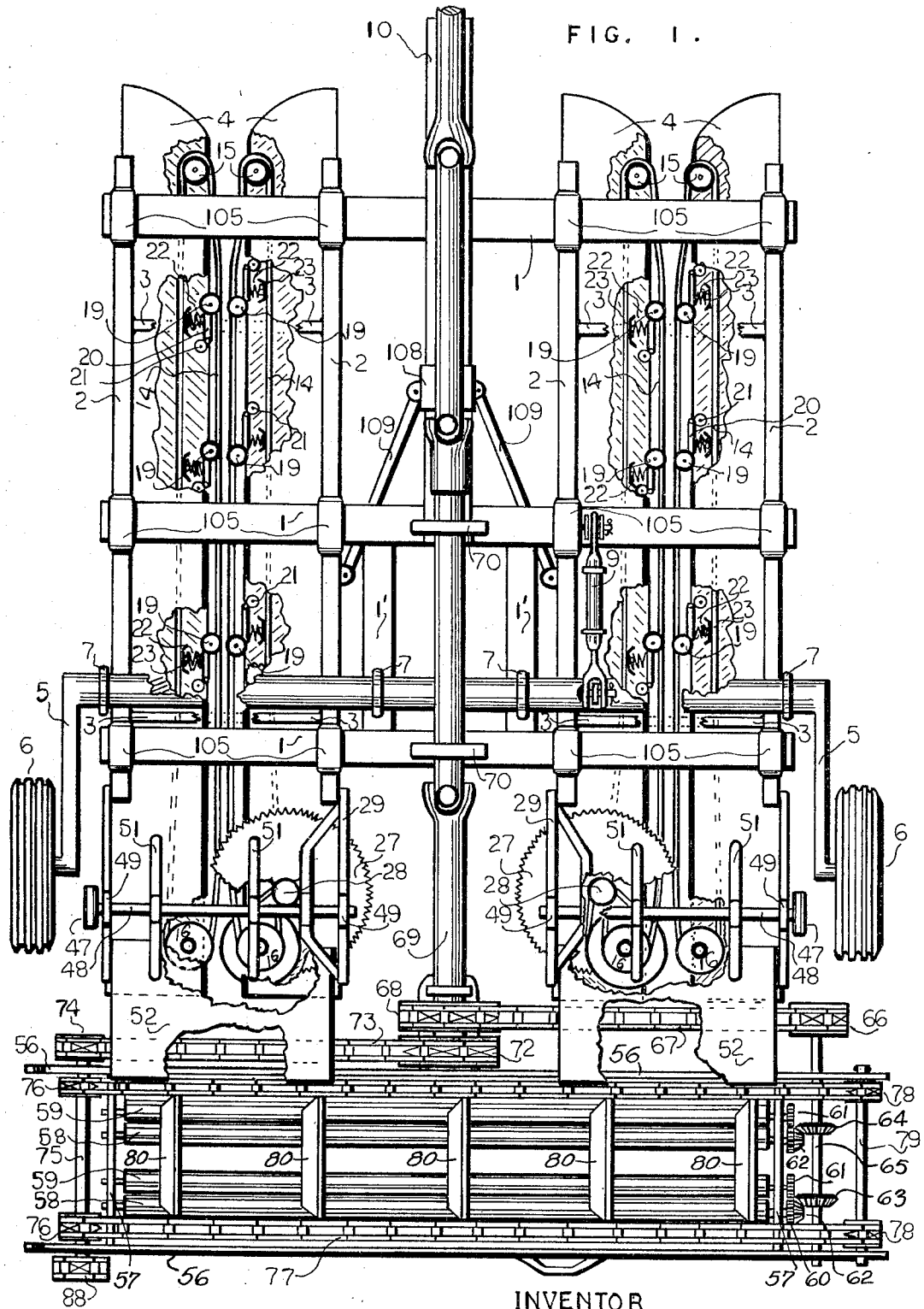

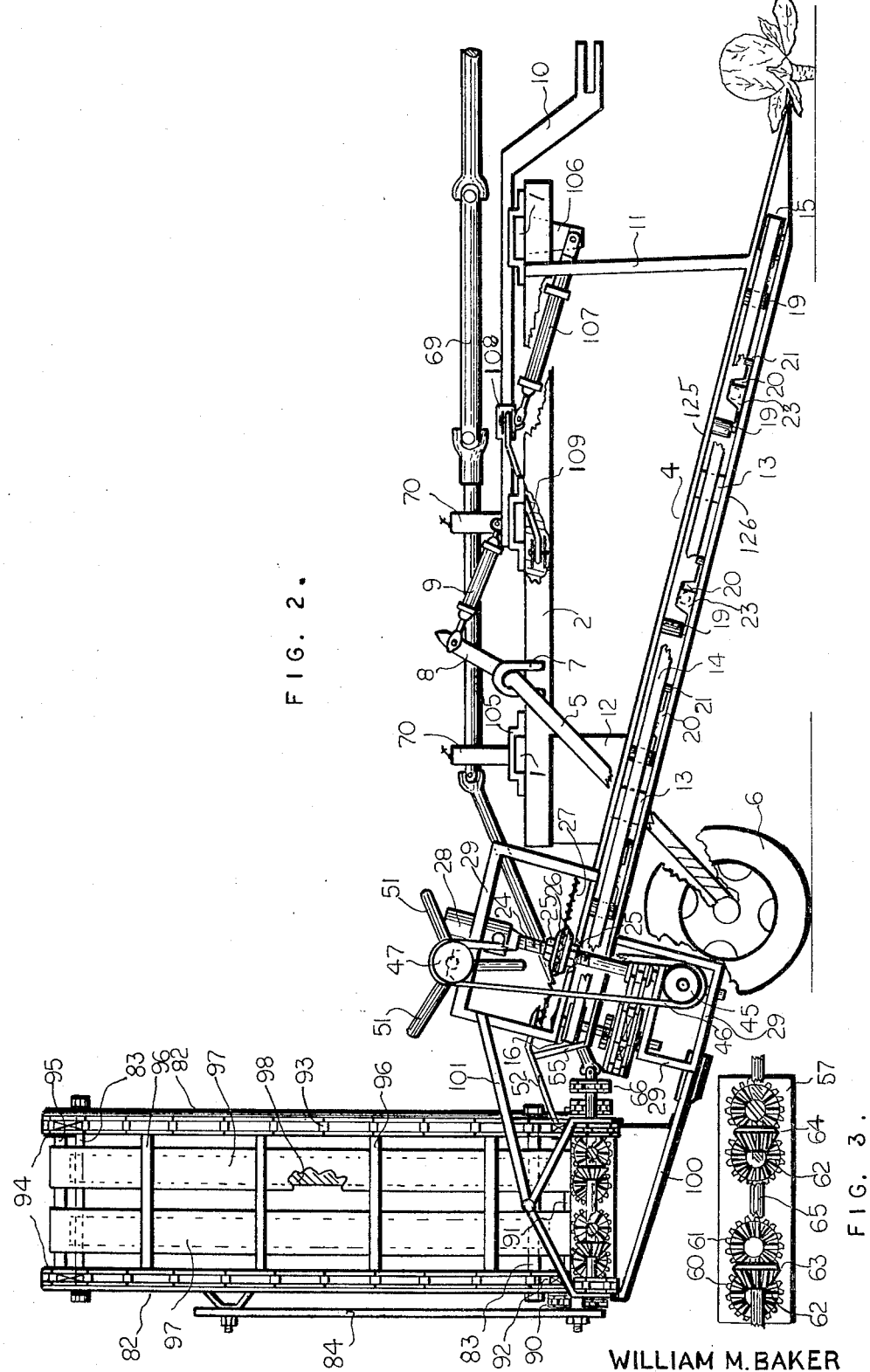

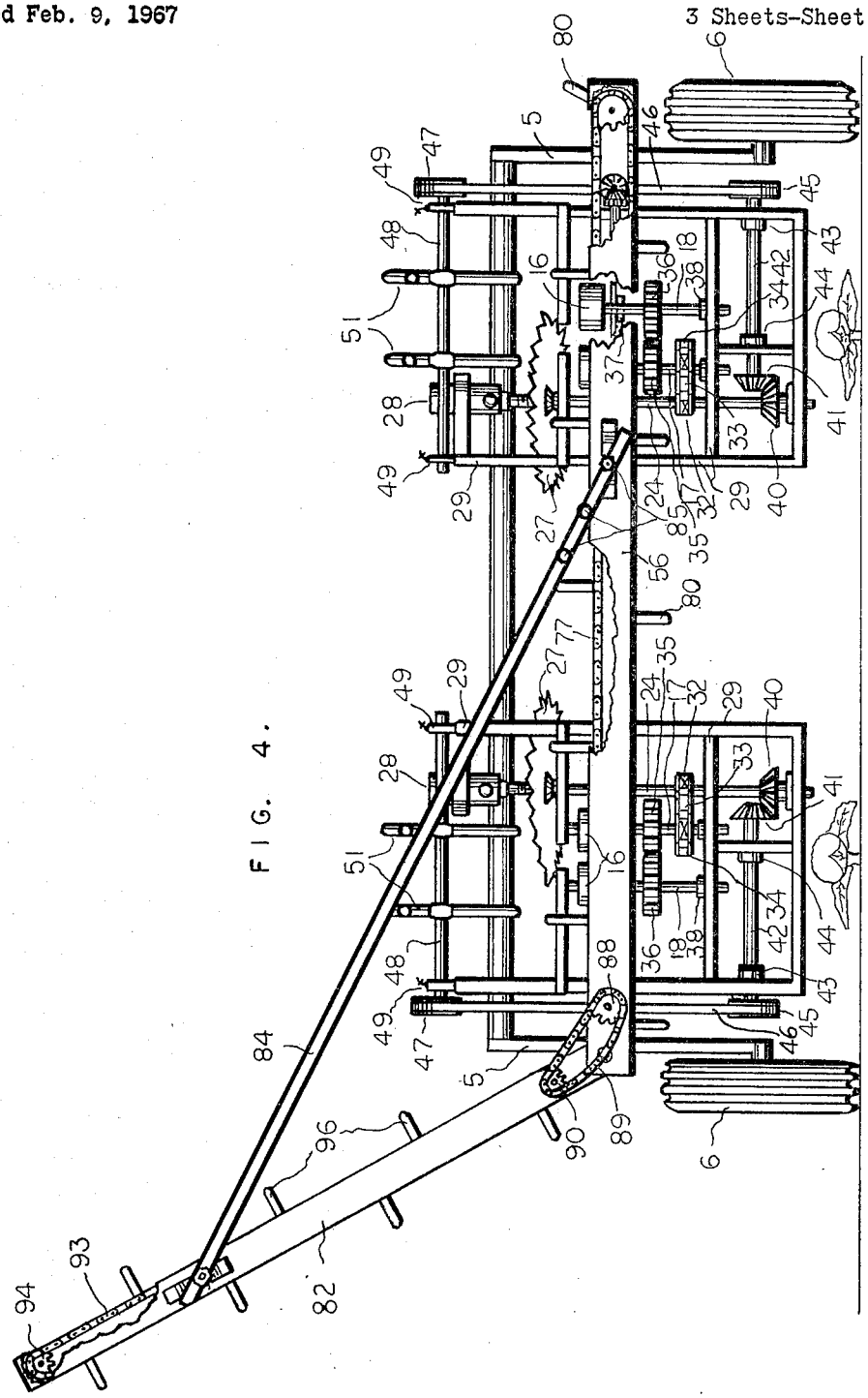

3,497,013
CABBAGE AND LETTUCE HARVESTERS
William M. Baker, Rose Road, Rte. 1,
Clyde, N.Y. 14433
Filed Feb. 9, 1967, Ser. No. 614,917
Int. Cl. A01d 27/02, 23/04, 45/26
U.S. Cl. 171—38          8 Claims

ABSTRACT OF THE DISCLOSURE

A tractor powered machine for multi-row harvesting of headed vegetable crops, such as cabbage and lettuce and cauliflower—cutting, trimming and loading the heads as a single field operation. Hydraulic units are incorporated into the machine for changing row widths, raising machine for transportion and to operate the cutting mechanism. Trimming conveyor and loading elevator are powered by the tractor power-take-off system.

---

The present invention relates to certain new and useful improvements in a machine for harvesting cabbage, lettuce, cauliflower and the like.

It has for one of its objects to provide a machine of this character for operative connection to a tractor with an arrangement of withdrawing and plant-conveying elements for withdrawing the plants from the ground and delivering them to a cutting mechanism with very minute adjustments.

Another object of the invention is to provide a machine of this character for harvesting and loading two rows during each traverse of the field with suitable means of row adjustment.

Another object is to provide a construction which can be raised and lowered hydraulically.

A further object of the invention is to provide a machine of this nature with a leaf-removing conveying system which operates to remove excess leaves from the heads as they are moved over a conveying and elevating unit to the accompanying truck.

A still further object is to provide a separate power source for each row-withdrawing and conveying unit.

Other objects and advantages will become apparent from the description of the preferred embodiment of the invention hereinafter given and illustrated in the accompanying drawings, where FIG. 1 is a plan view of the tractor harvester in which parts are broken away and shown in section.

FIG. 2 is a side elevation view of the harvester showing the elevator in which parts are broken away and shown in section.

FIG. 3 is an enlarged detail view showing the roller conveyor gear assembly.

FIG. 4 is a rear end elevation view of the machine with parts broken away and shown in section.

In the preferred embodiment of my machine shown in the drawing, it consists of a suitable frame consisting of three transversely extending and longitudinally spaced frame members 1, two of said members being connected by spaced, longitudinally extending members 1' and two of said members being connected by a longitudinally extending drawbar support member, a pair of transversely spaced, longitudinally extending beams adjustably supported on said frame members 1, on either side of said frame, cross braces 3, interconnecting each pair of said beams and each pair of beams supporting inclined guiding shoe members 4. A cross axle with rearward extending arms 5, and wheels 6, attached thereto is mounted crosswise and over the beams 2. Said cross axle being revolvable within U-bolts 7, positioned on frame member 1' and beams 2, and having an upwardly extending arm 8, welded thereto which is connected to a remote hydraulic cylinder 9. One end of said cylinder 9, being pinned to frame member 1, and the opposing end pinned to uwardly extending arm 8. Thus a means is provided for raising and lowering the machine hydraulically for road travel and for proper maintenance of operating height. At the front of the machine extending downward and forward from the frame is the drawbar frame member hitch 10, for securing the vehicle to the tractor.

From the forward portion of each beam 2, there extends downwardly a brace 11, which is welded to the lower front end of inclined guiding shoe member 4. At the rearward portion of each beam 2, a large bracket 12, extends downwardly and is welded to the upper portion of inclined guiding shoe member 4.

The inclined guiding shoe members 4, are made up of two parallel flat steel plates 125 and 126, with spacing elements 13, therebetween holding each in a parallel position—one over the other, with a space for propelling belt 14, therebetween. Said guiding shoe members 4, being suitably spaced apart for travel of heads of cabbage with the stems attached up the inclined member.

Near the lower end of each guiding shoe member 4, a sheave 15, is placed between and parallel to each flat steel member. Said sheave 15, being revolvable about a bolt connecting said flat steel members. Other sheaves 16, are similarly placed at the upward end of inclined guiding shoe members 4, being pinned to shaft 17, on the inner guiding shoe members 4, and shaft 18, on each outer guiding shoe member 4. A heavy rubber propelling belt 14, revolvably connects lower sheave 15, with upper sheave 16. Spring-backed rollers 19, positioned between flat steel members of guiding shoe member 4, force each propelling belt 14, toward the opposing belt 14, at the center. These rollers 19, are revolvably mounted upon upwardly extending stud portion of swivel frame 20, with opposing end of swivel frame 20, being pivotally connected by pin 21, to guiding shoe member 4. Springs 22, projecting from anchor base 23, force the swivel frame 20, to pivot on its connection thus maintaining rollers 19, in proper operating position acting as a tightener against propelling belt 14.

As best illustrated in FIGS. 2 and 4, a shaft 24, carried by framework 29, at upper rear portion of inclined guiding shoe member 4, is mounted at direct right angle to the inclined guiding shoe members and is positioned within each inner guiding shoe member. Said shaft 24, being threaded on its upper portion, with adjusting nuts 25, being threaded thereon with washers 26, and serrated cutting blade 27, positioned between each adjusting nut 25. Said cutting blade 27, being positioned over the guiding shoe member 4, and parallel thereto. By this construction it can be seen that a great range of cutting blade adjustment may be accomplished, ranging from a fraction of an inch to two inches or more, simply by backing off one adjusting nut and tightening the other.

A hydraulic motor 28, is mounted on the upper portion of framework 29, and is coupled directly to upper end of shaft 24, which is revolvable within flange type bearings positioned on each guiding shoe member and similar bearings positioned on lower portion of framework 29. On lower portion of shaft 24, best shown in FIGS. 2 and 4, is pinned a small sprocket 32, over which passes sprocket chain 33, driving large sprocket 34, which is pinned to lower portion of shaft 17. Slightly above this sprocket 34, on shaft 17, is pinned a spur gear 35, which meshes with spur gear 36, pinned on shaft 18. These shafts 17, and 18, being the ones which carry sheaves 16, pinned at their upper portion, and being revolvable within suitable bearings 37, on guiding shoe members and bearings 38, positioned on framework member 29. As seen in FIG. 4, shaft 17, revolves in a clockwise direction while shaft 18, revolves in a counter clockwise direction. At the lower extremity of shaft 24, is pinned a bevel gear 40, which meshes with bevel gear 41, pinned on horizontal shaft 42. Horizontal shaft 42, is supported by bearings 43 and 44, secured to framework 29, and carries at its outer end a sheave 45, pinned thereto. A belt 46, revolvably connects sheave 45, with sheave 47, pinned on shaft 48. Said shaft 48, being revolvably supported by bearings 49, mounted on upper portion of framework 29, and has flexible fingers 51, secured thereto for propelling the cut vegetable head onto the conveying chute 52. Conveying chute 52, is held in proper position by brace 55, with one end on top of rear portion of cutting blade 27, and other end resting over conveyor frame.

The loading conveyor is constructed of a framework having parallel members 56, with cross braces 57, welded thereto. Within this framework and positioned lengthwise are two sets of rollers 58 and 59. These rollers have a shaft projecting from each end and being supported by bearings secured to cross brace 57.

At the right ends of rollers 58 and 59, as seen in FIG. 1, are secured spur gears 60 and 61, meshing with each other. On the outer ends of the shafts supporting rollers 58, are secured bevel gears 62, which mesh with bevel gears 63 and 64 secured to shaft 65, which is revolvably supported by bearings on framework 56. This shaft 65, has a sprocket 66, secured at one end connected by a sprocket chain 67, with sprocket 68, which is secured to power-take-off shaft 69. Said power-take-off shaft 69, being revolvably carried by bearings 70, on frame members 1. As seen principally in FIG. 1, another sprocket 72 is secured to power-take-off shaft 69, between sprocket 68, and framework 56. This sprocket 72, is connected by sprocket chain 73, with sprocket 74, secured to shaft 75. Shaft 75 being positioned at the left-hand end of conveyor frame and being revolvably supported by bearings secured to frame members 56. Now this shaft 75, has two sprockets 76, secured thereto just inside each frame member 56, these sprockets 76, being connected by sprocket chain 77, with sprockets 78, secured to shaft 79, at right-hand end of conveyor frame 56. Shaft 79, being revolvably supported by bearings on frame member 56. The sprocket chains 77, having cross flights 80, welded at right angles thereto. It will be noted here that this conveyor unit is designed for excess leaf removal from the heads as they are conveyed along by the cross-flights over the rotating rollers. You will note that the rollers are positioned in sets with an open space between, and with rollers 58, revolving over to the right or clockwise and rollers 59, revolving over to the left or counter clockwise, thus any loose leaves are caught between the rollers and dropped to the ground as the heads are conveyed along the rollers by the cross-flights attached to the sprocket chains 77.

The conveyor unit is supported by braces 100, which are slidably connected at one end to framework 29, and at opposing end is connected to base of conveyor by bolts; and by hanger type braces 101, which hook under the lower edge of conveyor at one end and are secured to the upper portion of framework 29, at the other end.

As the vegetable heads move along on the conveyor they go to the loading elevator shown in FIGS. 2 and 4. This loading elevator is constructed of a framework consisting of two parallel members 82, with cross braces 83, positioned at right angles thereto. This loading elevator is secured by bolts to projecting attaching point of conveyor framework members 56, and is held in an angularly inclined position by guy-rod 84. Said guy-rod 84, being secured by bolts to elevator frame member 82, at one end and by bolts to conveyor frame member 56, at opposing end. A series of holes 85, at lower end of guy-rod 84, allow for changing the loading angle of elevator, by bolting in various positions.

This loading elevator receives its motivation from sprocket 88, securer to shaft 75, on left-hand end of conveyor frame. Sprocket 88, being connected by sprocket chain 89, with sprocket 90, secured to shaft 91, which is revolvably supported by bearings positioned on loading elevator frame member 82. Shaft 91, having sprockets 92, secured thereto just inside each frame member 82, with sprocket chains 93, connecting these sprockets 92, with sprockets 94, secured near either end of shaft 95, at upper end of elevator, shaft 95 being revolvably supported by bearings carried by frame member 82. Cross flights 96, for moving the cabbage heads up the inclined elevator are secured at right angles with the sprocket chain 93. Equally spaced endless belts 97, with open spaces between and at each side are secured to cross flights 96, and are revolvable around shafts 91 and 95. Under each endless belt 97, are positioned equally spaced stationary members 98, which act to support the weight of the vegetable heads on the endless belts 97. These stationary members 98, are secured at the top and bottom to the cross braces 83.

By this construction of the loading elevator it can readily be seen that any loose leaves which escape the conveyor rolls would easily fall through the open spaces between belts to the ground.

Since this machine is designed to withdraw, sever and load two rows of cabbage, lettuce and the like at each traverse of the field, and since farmers sometimes plant their crops in varying row widths, I have made provision for changing the width of my harvester to accommodate different row widths. The inclined guiding shoe member assembly and accompanying beams 2, is an individual unit for each row, having sleeves 105, welded to top edge of beams 2, and adapted to slide across frame member 1. A downwardly extending projection 106, secured to front frame member 1, has one end of a hydraulic cylinder 107, pinned thereto with the opposing end pinned to sleeve 108, which is designed to slide smoothly on drawbar frame member 10. Sleeve 108, has outwardly extending arms 109, pinned to its side member, with opposing ends of arms 109, pinned to beams 2, thereby creating an arrangement whereby the row widths can be quickly and easily changed by hydraulic means from the tractor.

In using my machine it is hooked to a tractor at the drawbar hitch 10, power-take-off shaft which operates the conveyor and loading elevator are connected; hydraulic hose lines are connected to hydraulic cylinders for raising and lowering and changing row widths; and hydraulic hose lines are connected to each hydraulic motor 28, which operate the propelling belts and cutting blades.

The inclined guiding shoe members 4, are spaced in the center just wide enough to admit the stem but not the head, with the lower ends of inclined guiding shoe members 4, arranged to pass each side of the cabbage row and guide the stems toward and inbetween each shoe, and as the machine advances the cabbage stem is brought into engagement with and between flexible propelling belts 14, which are held tight against each stem by means of the spring-backed rollers 19. As the machine advances at nearly the same rate of speed at which the flexible propelling belts are drawn to the rear with the cabbage stem between them, the cabbage is caused to be lifted out of the ground and carried with the stem at direct right angle to the inclined guiding shoe members until the stem is brought into contact with the cutting blade which severs the head at any desired degree of height; point of cut being adjusted simply and quickly by changing the height of cutting blade on shaft. The cabbage head is now propelled onto conveying chute 52, by overhead flexible fingers 51, where it rolls onto conveyor, being moved over leaf-removing rollers toward loading elevator by cross-flights 80, to drop onto loading elevator where it is carried by cross-flights 96, up to drop into accompanying truck. The stem portion of the vegetable plant is carried to ends of propelling belts 14, where it is dropped to the ground.

Note the following improved features of my harvesting machine, viz, the withdrawing and conveying means does not employ the use of the standard sprocket chains which can only loosely carry the stems up the inclined guiding shoe at any angle, but instead uses a new and novel means of spring-tensioned conveying belts of a flexible nature which grip the stems between them at just the proper position for the cutting blade to sever the heads on a square plane relative to the vegetables, and this point too being independent of the height which the vegetables extend above the ground, and also being very adjustable.

There is also provided a means by which each withdrawing and severing unit is individually powered by means of hydraulic motors, and a novel overhead flexible finger propelling means.

Also note the load conveying system whereby the heads are moved over rotating rollers which grasp and remove the excess leaves.

Although this invention has been herein shown and described in what is conceived to be the most practical and preferred embodiment, it is recognized that departure may be made therefrom within the scope of the invention which is not to be limited to the details disclosed herein, but is to be accorded the full scope of the claims so as to embrace any and all equivalent structures.

The invention having been herein described, what is claimed and sought to be secured by Letters Patent is:

1. In a harvester for a headed crop, such as cabbage, lettuce, etc., comprising:
   (A) a frame,
   (B) wheel means adjustably mounted on said frame so that the height of said frame relative to the ground surface may be varied,
   (C) forwardly extending drawbar means connected to said frame,
   (D) a pair of transversely spaced, longitudinally extending beams adjustably mounted on each side of said frame so that the spacing therebetween may be varied to accommodate variously spaced plant rows,
   (E) inclined harvesting means including coacting spring biased endless belt means supported by each pair of said beams, said belt means being adapted to grasp each stem beneath the head, pull it out of the ground and convey it upwardly and rearwardly,
   (F) cutting means supported by said frame at the top of said harvesting means and disposed immediately above said belt means and adapted to cut the stems, being conveyed by said belt means, immediately beneath the heads,
   (G) propelling means supported by said frame and disposed above said cutting means to move the severed heads rearwardly away from said cutting means,
   (H) individual drive means supported on each side of said frame and connected to operate the harvesting means, cutting means and propelling means on the respective side,
   (I) conveying and separating means supported by said frame rearwardly of said cutting and propelling means and adapted to receive the severed heads from said propelling means, said heads having loose leaves separated therefrom as they are being conveyed,
   (J) elevator means pivotally connected to said conveying and separating means and adapted to receive the heads therefrom so as to convey and deposit them in an adjacent movable container,
   (K) an adjustable means securing the other end of said elevator means to the midportion of said conveying and separating means and
   (L) drive means connected to said conveying and cleaning means and the elevator means and adapted to be connected with the power-take-off of the pulling vehicle connected to said drawbar means.

2. The device of claim 1 which includes means mounted on said frame and connected to each of said pair of beams so as to vary the spacing therebetween.

3. The device of claim 1 which includes an inclined shaft supported on said frame and means adjustably mounting said cutting means on said shaft.

4. The device of claim 3 wherein said cutting means is a flat rotary member.

5. The device of claim 1 wherein said propelling means is a substantially horizontally disposed rotary member having radical fingers.

6. The device of claim 1 wherein said individual drive means is an hydraulic motor.

7. The device of claim 1 wherein said conveying and separating means is substantially horizontal and transversely disposed and includes at least one pair of counter-rotating leaf grasping rollers and endless means surrounding said rollers and adapted to move said heads longitudinally over said rollers.

8. The device of claim 1 wherein said elevator means includes a pair of spaced endless belts and endless chain means with connecting cross members surrounding said endless belts and adapted to receive said severed heads and convey them in conjunction with said belts.

References Cited

UNITED STATES PATENTS

| | | | |
|---|---|---|---|
| 721,496 | 2/1903 | Bartlett | 171—38 |
| 938,881 | 11/1909 | Lee et al. | 171—38 |
| 1,075,440 | 10/1913 | Ramsey | 171—38 |
| 2,297,065 | 9/1942 | McLendon | 171—61 XR |
| 2,531,379 | 11/1950 | Chickering | 171—36 XR |
| 2,833,358 | 5/1958 | Lust | 171—37 |
| 2,907,393 | 10/1959 | Hawkins | 171—61 |
| 2,911,051 | 11/1959 | Williams et al. | 171—37 XR |

RUSSELL R. KINSEY, Primary Examiner

U.S. Cl. X.R.

56—327; 171—61